March 15, 1932.    A. M. ENGLISH    1,849,542
MEASURING DEVICE
Filed Nov. 1, 1928    4 Sheets-Sheet 1
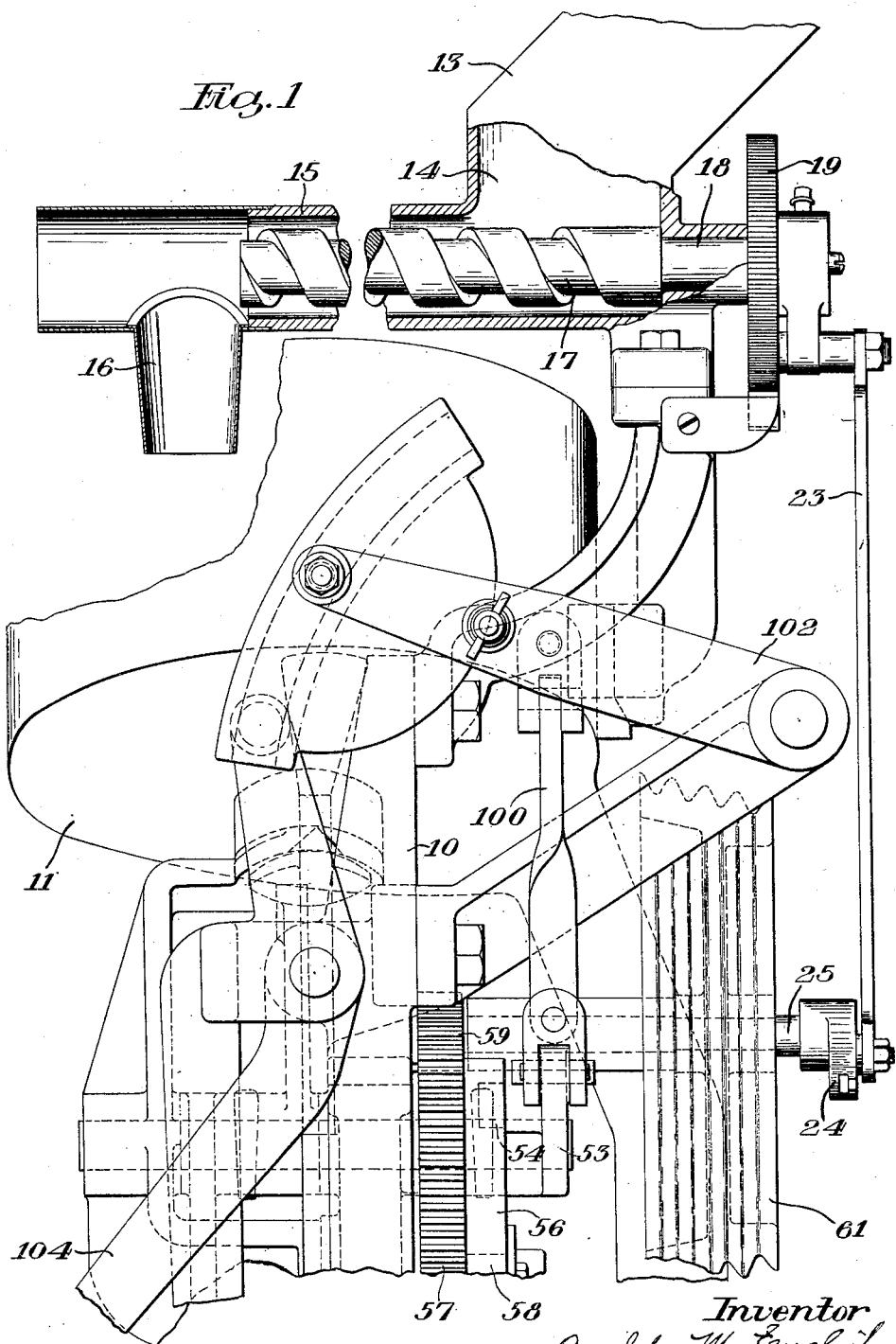

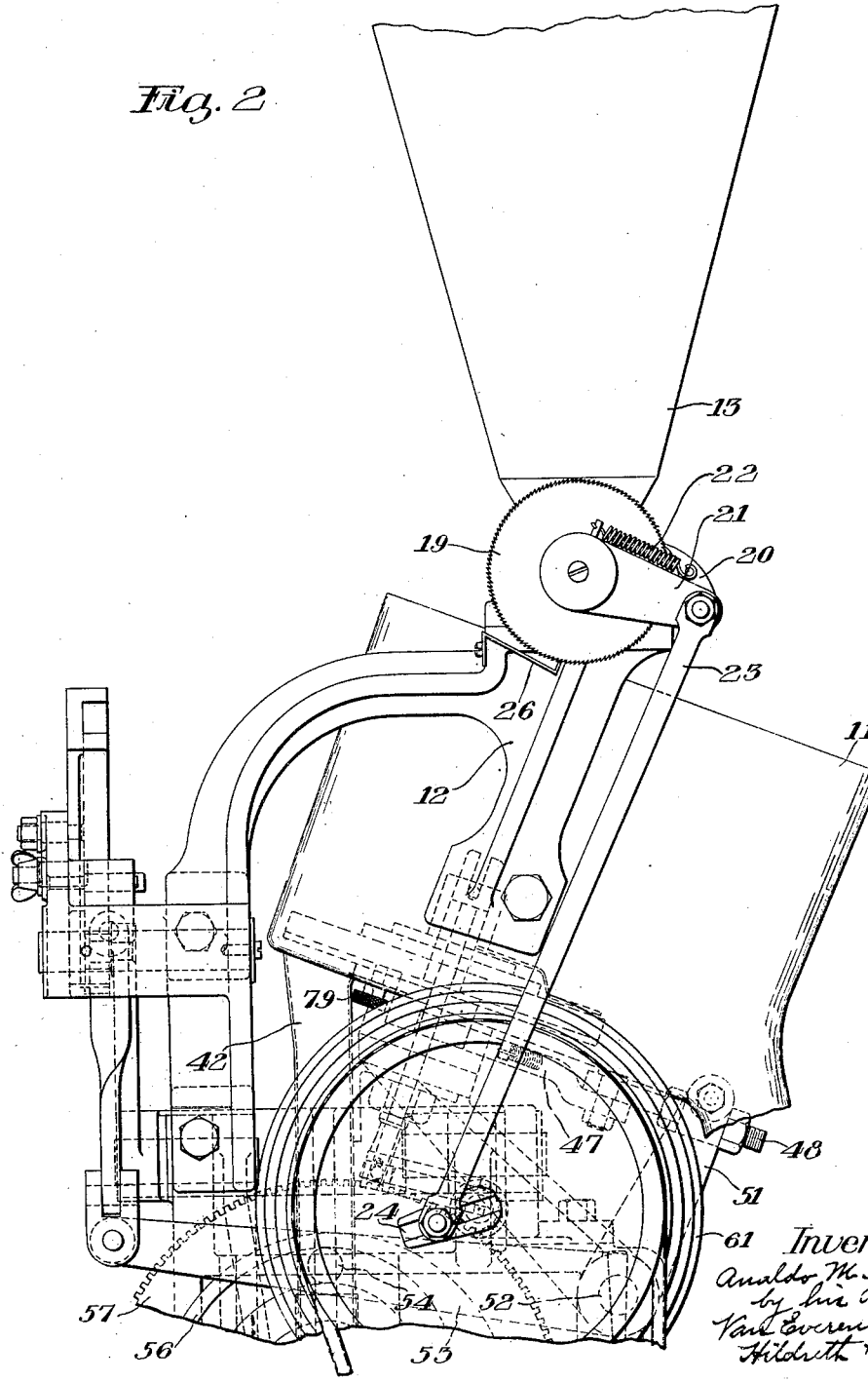

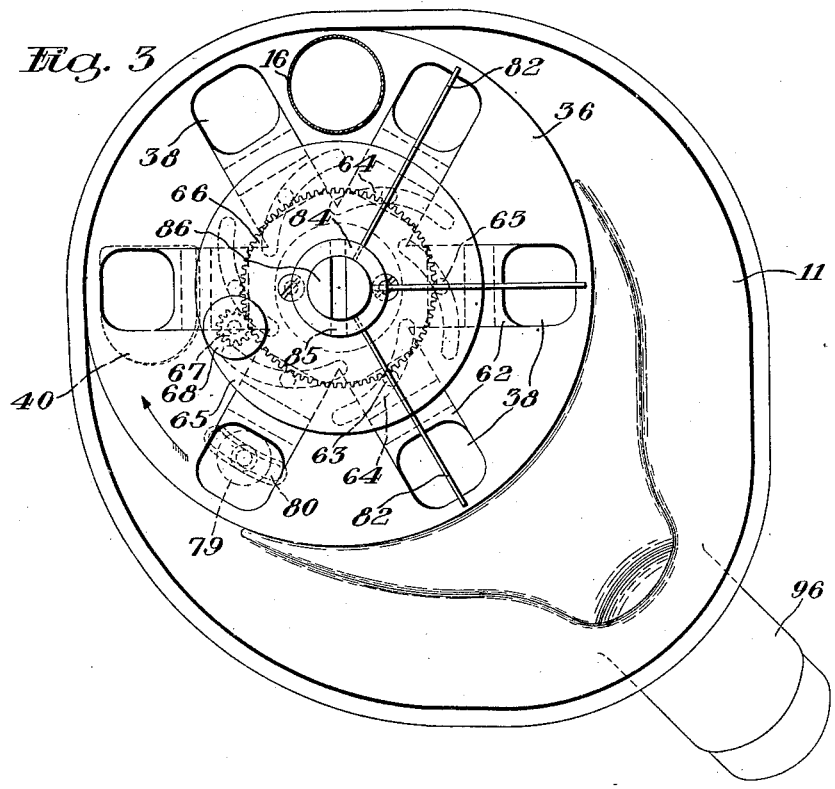
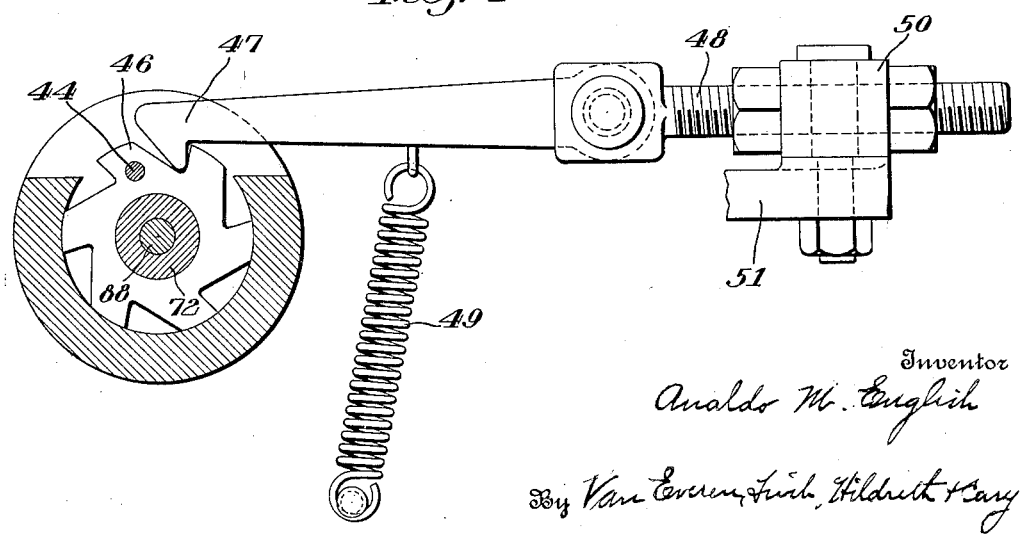

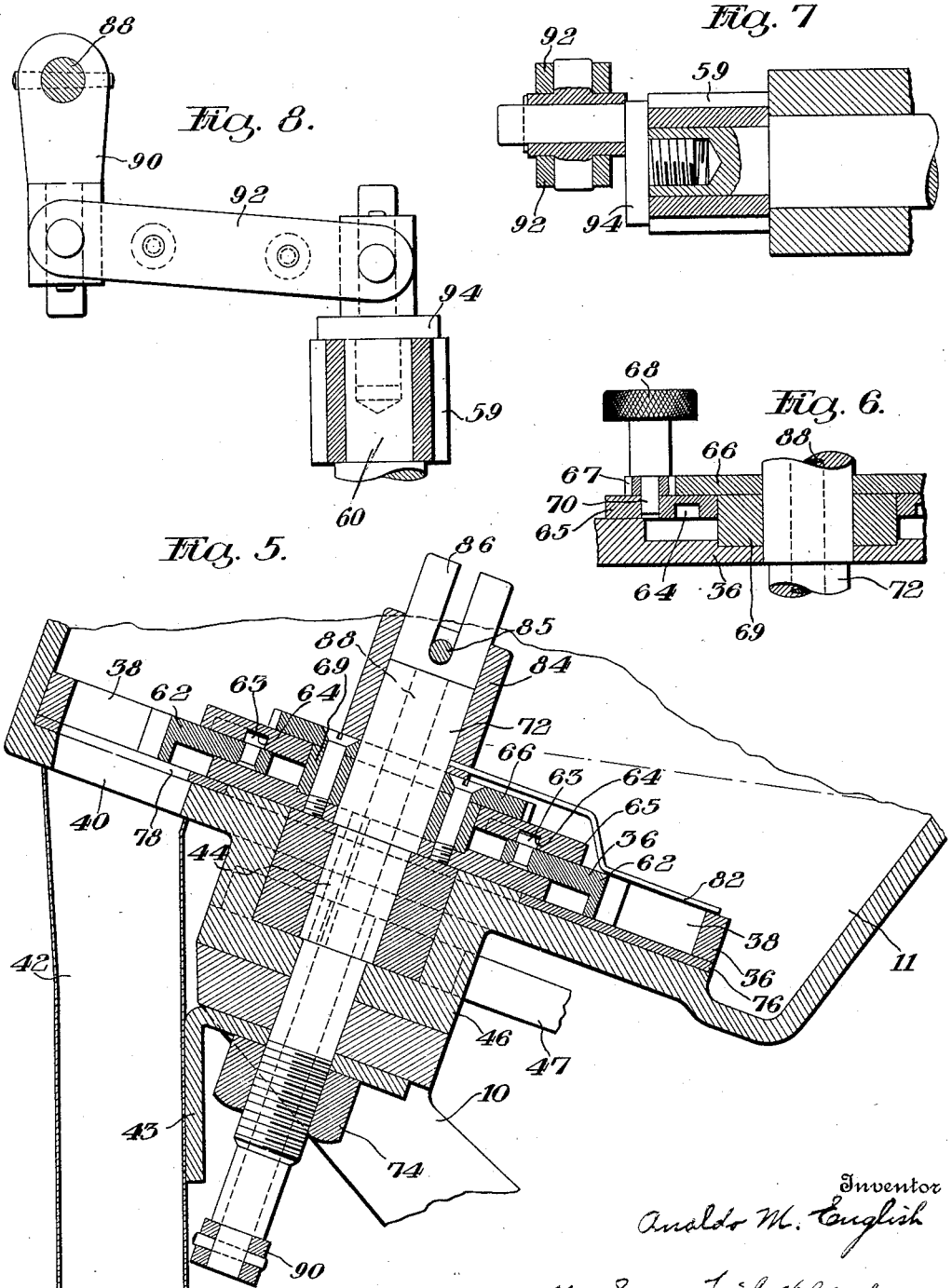

Patented Mar. 15, 1932

1,849,542

UNITED STATES PATENT OFFICE

ANALDO M. ENGLISH, OF BROOKLINE, MASSACHUSETTS, ASSIGNOR, BY MESNE ASSIGNMENTS, TO PNEUMATIC SCALE CORPORATION, LIMITED, OF QUINCY, MASSACHUSETTS, A CORPORATION OF MASSACHUSETTS

MEASURING DEVICE

Application filed November 1, 1928. Serial No. 316,572.

The present invention relates to measuring devices and more particularly to devices for measuring predetermined quantities of loose material to be wrapped or packaged as described in the co-pending application of English, Serial No. 646,574, filed June 20, 1923, of which this application is a continuation in part.

The object of the present invention is to provide a machine for measuring predetermined quantities of loose material which are to be wrapped in individual bags or packages and to this end the invention consists in the measuring device hereinafter described and particularly defined in the claim.

In the accompanying drawings, Fig. 1 is a side elevation of a machine embodying the features of the present invention; Fig. 2 is a rear elevation of the machine shown in Fig. 1; Fig. 3 is a plan view of the measuring hopper; Fig. 4 is a detail view of the means for actuating the measuring device; Fig. 5 is a sectional elevation of the measuring hopper shown in Fig. 3 and its associated parts; Fig. 6 is a detail view showing the means for adjusting the measuring device; and Figs. 7 and 8 are detail views illustrating the means for actuating the measuring fingers.

The invention described in the co-pending application above referred to comprises a machine for wrapping predetermined amounts of tea to form tea bags for individual service. To the accomplishment of this end, the machine comprises first a measuring mechanism; second, a delivery device into which the measured charges of tea are dumped and conveyed to the wrapper; third, a wrapper or bag forming mechanism over which a cloth wrapper is drawn, and into which the delivery device extends to assist in the formation of the wrapper about the charge of tea; and fourth, a wrapper feeding and cutting mechanism by which predetermined lengths of wrapping material are presented at regular intervals to the bag forming mechanism. The apparatus to be described herein comprises only the measuring mechanism, the other mechanisms being completely described in the parent application.

Referring to the drawings, a bracket 10 secured to the main frame of the machine supports a measuring hopper 11 to which is secured a bracket 12 supporting the main supply hopper 13. The supply hopper, as shown in Fig. 1, is formed at the bottom with a restricted throat 14 leading into an outwardly extending feed tube 15 having at its end a downwardly directed spout 16 through which the tea is discharged into the measuring hopper 11. The tea is fed from the supply hopper 13 to the spout 16 by means of a rotatable screw 17 which has at its rear end a portion 18 of reduced diameter journaled in a suitable bearing in the hopper. Mounted on the end of the shaft 18 is a ratchet 19 which is adapted to be advanced by the pawl 20 pivoted on the end of a pawl carrier 21 which is mounted to oscillate on the end of the shaft 18. A spring 22 connected between the pawl and the carrier arm serves to maintain the pawl in engagement with the ratchet. A connecting rod 23 is pivoted at one end to the pawl carrier and is adjustably connected at the other end to a crank 24 mounted on the main shaft 25 of the machine. As shown in Figs. 1 and 2, the crank 24 is longitudinally slotted in order that the connecting rod may be adjustably connected therewith and the amount of throw of the pawl thereby regulated. A spring finger 26 secured to the bracket 12 engages with the ratchet and prevents overrunning or reverse movement thereof.

The tea discharged from the spout 16 falls into the measuring hopper 11. Rotatable within the hopper is a measuring disk 36 having a series of openings 38 near the periphery and of the proper size to hold the desired amount of a single charge of tea. The disk is rotated step by step to bring successive openings above a discharge opening 40 in the hopper which leads into a delivery tube 42 rigidly secured to a bracket 43 which in turn is secured to the upper bracket 10. As shown in Fig. 5, the hopper and measuring disk are inclined so that the opening 38 which is above the discharge opening 40 is at the maximum height, the hopper 11 being filled with sufficient tea to cover the lower part of the measuring disk. It will be seen that upon rotation of the disk, the successive openings 38 will be filled and successive charges of tea will be dumped from the uppermost opening into the delivery tube.

In order to impart rotation to the measuring disk, the disk is connected by means of a pin 44 with a ratchet 46 which is engaged at regular intervals by a reciprocating pawl 47 pivoted on a threaded member 48 and held in engagement with the ratchet by a spring 49 secured between the pawl arm and the hopper. The member 48 is connected through a block 50 with an arm 51 secured to a rock shaft 52 which is journaled in the machine frame. The rock shaft is oscillated by a lever 53 carrying a cam roll 54 which is actuated by a cam groove in a cam 56 secured to the main gear 57 of the machine. The gear 57 is rotated over a fixed stud 58 by a pinion 59 on the drive shaft 25 of the machine, the shaft being driven from any suitable source of power through pulleys 61. By means of the reciprocations of the pawl, the openings 38 are successively advanced into discharge position.

The opposite end of the lever 53 has pivoted to it a link 100 which operates the oscillating arm 102, the latter controlling the movement of the cloth feeding arm 104, as described in the above-mentioned co-pending application.

Provision is made for adjusting the openings 38 to measure any desired amount of material. To this end adjustable blocks 62 are provided to slide radially of the disk 36, each of the blocks having a pin 63 engaging a cam slot 64 in an adjusting disk 65 which is rotatable over a collar 69 secured together with a gear 66 to the measuring disk. The gear is adapted to mesh with a removable pinion 67 mounted upon a hand knob 68 and provided with a stud 70 which is adapted to be received in a suitable opening in the disk 65 so that the disk may be accurately rotated by hand to vary the position of the blocks 62.

The parts of the measuring apparatus thus far described are mounted around a stationary sleeve 72 which passes through the hopper and the brackets 10 and 43 and is secured in place by a nut 74 which is threaded over the lower end of the sleeve and bears against the bracket 43. In order that the time of discharging into the tube 42 may be accurately adjusted, an additional disk 76 is provided beneath the measuring disk 36 and has an opening 78 through which the tea must discharge into the delivering tube 42. The disk 76 may be rotated relatively to the measuring disk by means of a hand screw 79 threaded into the disk 76 and passing through a circular slot 80 in the hopper, so that the size of the discharge opening may be accurately adjusted and also the edge of the discharge opening advanced so that the time of discharge may be correspondingly retarded.

The material after being placed in the openings 38 for measurement is leveled off flush with the top of the measuring disk by means of oscillating leveling fingers 82 which are mounted in a sleeve 84 connected by a pin 85 to the slotted head 86 of a shaft 88 which passes centrally up through the sleeve 72. As indicated in Figs. 7 and 8, the shaft 88 is pinned to a crank arm 90 which is connected through a pitman 92 with a crank 94 mounted in the end of the drive shaft 60, so that the rotation of the shaft 60 oscillates the shaft 88 and the leveling fingers 82, the extent of oscillation of the fingers being approximately the width of one of the openings 36.

It will be observed that the leveling finger sleeve 84 and measuring disk with its appurtenant parts are readily removable from the sleeve 72. Accordingly, a number of measuring disks of different depths may be provided, so that a wide range of adjustment for the amounts of tea to be measured is obtained.

In operation of the machine, the measuring disk turns in the direction of the arrow in Fig. 3. Sufficient tea is maintained in the measuring hopper to cover the lowermost openings 38 of the measuring disk, the approximate level of tea maintained in the measuring hopper being indicated by the dot-and-dash line in Fig. 5. As the supply of tea in the measuring hopper tends to decrease, additional tea is supplied from the main hopper through the operation of the screw feed. The position of discharge of the tea into the measuring hopper is indicated by the sectional view of the spout 16 in Fig. 3. Considering any one of the openings 38, it will be seen that as the disk rotates, that opening will pass below the level of tea in the hopper, where it is completely filled and levelled off. As it emerges from the mound of tea, it proceeds to its uppermost position to dump the charge into the tube 42, which carries it to the bag forming mechanism to form a package of the proper size, as desired in the co-pending application. It will be seen that the spout 16 is so placed as not to introduce tea into an opening 38 which has been properly filled and levelled. An overflow pipe 96 is provided in the measuring hopper near the bottom thereof to permit an excess of tea in the hopper to overflow, if necessary, thus maintaining the proper level in the measuring hopper, even though the screw feed should be adjusted to operate too rapidly. However, by properly adjusting the rate of the screw feed, the tea supplied from the main hopper 13 may be nicely regulated to maintain the measuring hopper at a predetermined level throughout the entire operation of the mechanism so that an inappreciable quantity of tea will flow out through the overflow tube.

Having thus described the invention, what is claimed is:

In a tea bagging machine, in combination, a measuring hopper, a measuring disk provided with a plurality of openings therethrough constituting measuring units, a discharge opening in the bottom of the hopper located above the normal level of the tea therein and into which tea may be discharged from the several measuring openings as the disk is rotated, and an adjusting disk provided with an opening interposed between the bottom of the hopper and the measuring disk for adjustably determining the size of the discharge opening.

In testimony whereof I have signed my name to this specification.

ANALDO M. ENGLISH.